(12) United States Patent
Hisanaga et al.

(10) Patent No.: US 10,053,142 B2
(45) Date of Patent: Aug. 21, 2018

(54) ELECTRIC POWER STEERING APPARATUS

(71) Applicant: NSK LTD., Tokyo (JP)

(72) Inventors: Tomonori Hisanaga, Maebashi (JP); Fumitoshi Nakamura, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 15/111,855

(22) PCT Filed: Sep. 3, 2015

(86) PCT No.: PCT/JP2015/075036
§ 371 (c)(1),
(2) Date: Jul. 15, 2016

(87) PCT Pub. No.: WO2016/059903
PCT Pub. Date: Apr. 21, 2016

(65) Prior Publication Data
US 2017/0305455 A1 Oct. 26, 2017

(30) Foreign Application Priority Data
Oct. 17, 2014 (JP) ................. 2014-212727

(51) Int. Cl.
*B62D 5/04* (2006.01)
*B62D 6/00* (2006.01)

(52) U.S. Cl.
CPC ........... *B62D 5/046* (2013.01); *B62D 5/0493* (2013.01); *B62D 6/00* (2013.01)

(58) Field of Classification Search
CPC .... B62D 5/046; B62D 5/0481; B62D 5/0484; B62D 5/049
See application file for complete search history.

(56) References Cited

U.S. PATENT DOCUMENTS 4,869,334 A * 9/1989 Marumoto ........... B62D 5/0463
180/404
7,433,767 B2 * 10/2008 Takeuchi ............... B62D 5/003
180/443

(Continued)

FOREIGN PATENT DOCUMENTS

JP 6-32240 A 2/1994
JP 2006-76333 A 3/2006

(Continued)

OTHER PUBLICATIONS

International Search Report for PCT/JP2015/075036 dated Dec. 8, 2015.

*Primary Examiner* — Kevin Hurley
(74) *Attorney, Agent, or Firm* — Sughrue Mion, PLLC

(57) ABSTRACT

An electric power steering apparatus that performs an assist control of a steering system, including: at least two respectively independent torque sensors and angle sensors, wherein having a function that respectively calculates steering angles from the torque sensors and the angle sensors to utilize, wherein comparison diagnoses of independent signals are performed and also concurrently individual diagnoses of each individual signal are performed, in a case that it is judged that there is an abnormality in the comparison diagnoses, the angle sensor signals are not used, in a case that it is judged that at least one of the individual diagnoses is abnormal, the angle sensor signal is treated as downgrading, and in a case that it is judged that two or more of the individual diagnoses are abnormal, the angle sensor signals are not used.

18 Claims, 7 Drawing Sheets

(56) References Cited

U.S. PATENT DOCUMENTS

| | | | | |
|---|---|---|---|---|
| 7,698,035 B2* | 4/2010 | Chino | ............... | B62D 5/005 |
| | | | | 180/204 |
| 8,089,233 B2 | 1/2012 | Kanekawa et al. | | |
| 9,452,775 B2* | 9/2016 | Tamura | ............ | B62D 5/0481 |
| 2011/0218704 A1* | 9/2011 | Kanekawa | .......... | B62D 5/0484 |
| | | | | 701/29.2 |
| 2013/0332029 A1* | 12/2013 | Kim | ............... | B62D 5/0484 |
| | | | | 701/41 |
| 2014/0236427 A1* | 8/2014 | Kim | ................. | B62D 5/046 |
| | | | | 701/41 |

FOREIGN PATENT DOCUMENTS

| | | |
|---|---|---|
| JP | 2006-151182 A | 6/2006 |
| JP | 2007-333657 A | 12/2007 |
| JP | 2009-58291 A | 3/2009 |

\* cited by examiner

PRIOR ART

FIG.3
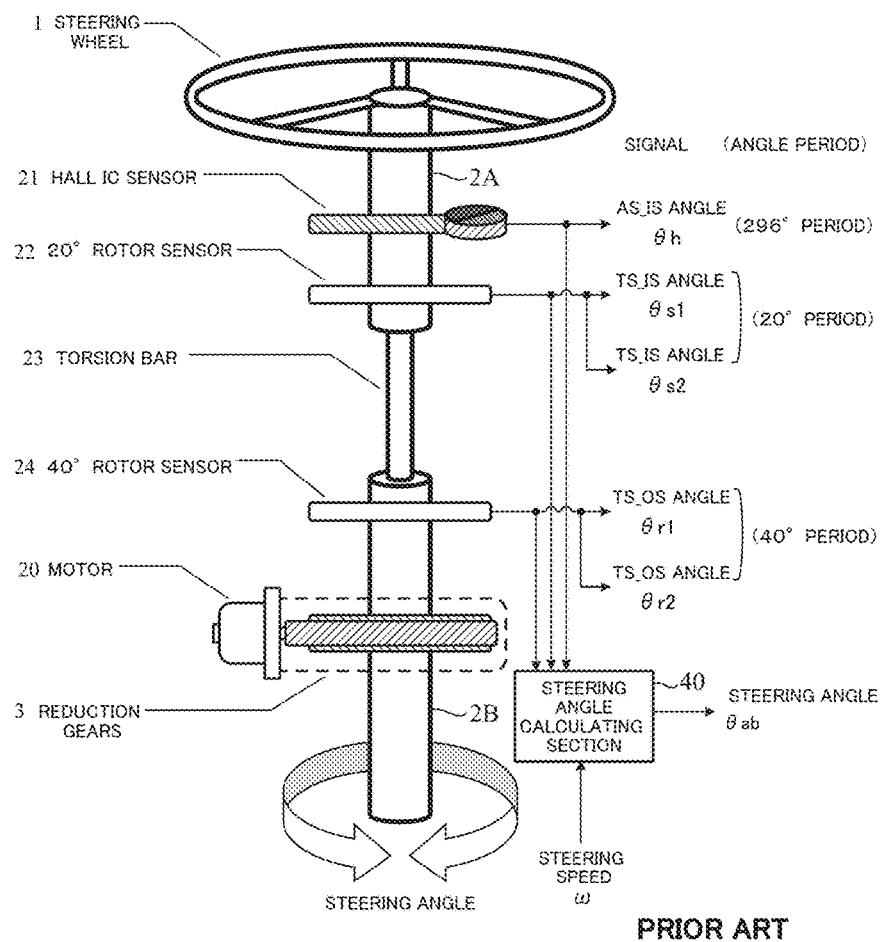
PRIOR ART
FIG. 4(A) θh AS_IS
FIG. 4(B) θs1 TS_IS
FIG. 4(C) θr1 TS_OS
0 20 40 60 80 --- --- 296 --- --- 1480 [deg]
↑ CALIBRATION
PRIOR ART

ELECTRIC POWER STEERING APPARATUS

CROSS REFERENCE TO RELATED APPLICATIONS

This application is a National Stage of International Application No. PCT/JP2015/075036 filed Sep. 3, 2015, claiming priority based on Japanese Patent Application No. 2014-212727 filed Oct. 17, 2014, the contents of all of which are incorporated herein by reference in their entirety.

TECHNICAL FIELD

The present invention relates to an electric power steering apparatus that has a redundant system configuration, and in particular to an electric power steering apparatus that is a configuration of respectively calculating steering angles from respectively independent two torque sensors and two angle sensors, performs comparison diagnoses of independent detection signals, also concurrently performs individual diagnoses of each detection signal and is capable of continuing functions such as assist etc. without spoiling reliability.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus (EPS) will be described with reference to FIG. FIG. 1. As shown in FIG. 1, a column shaft (a steering shaft or a handle shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Th of the steering wheel 1, and a motor 20 for assisting the steering force of the steering wheel 1 is connected to the column shaft 2 through the reduction gears 3. Moreover, the column shaft 2 is provided with a steering angle sensor 14 for detecting a steering angle θ. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of the steering torque Th detected by the torque sensor 10 and a vehicle speed Vel detected by a vehicle speed sensor 12, and controls a current supplied to the motor 20 on the basis of a voltage control value Vref obtained by performing compensation and so on with respect to the calculated current command value.

A CAN (Controller Area Network) 40 for transmitting/receiving various information about the vehicle is connected to the control unit 30, and it is also possible to receive the vehicle speed Vel from the CAN 40. Further, a non-CAN 41 for transmitting/receiving communications, analog/digital signals, radio waves, etc. except for the CAN 40 can also be connected to the control unit 30.

In such an electric power steering apparatus, the control unit 30 mainly comprises a CPU (also including an MPU, an MCU, or the like), and for example, general functions performed by programs within the CPU are shown in FIG. 2.

Functions and operations of the control unit 30 will be described with reference to FIG. 2. As shown in FIG. 2, the steering torque Th from the torque sensor 10 and the vehicle speed Vel from the vehicle speed sensor 12 are inputted into a current command value calculating section 31. The current command value calculating section 31 calculates a current command value Iref1 based on the steering torque Th and the vehicle speed Vel and by means of an assist map or the like. The calculated current command value Iref1 is added to a compensation signal CM from a compensating section 34 for improving characteristics in an adding section 32A, an added current command value Iref2 is inputted into a current limiting section 33 so that a maximum current is limited. A current command value Irefm that the maximum current is limited, is inputted into a subtracting section 32B, and a subtraction of a motor current detection value Im from the current command value Irefm is performed.

A subtraction result I (=Irefm-Im) of the subtracting section 32B is PI-controlled in a PI control section 35. The PI-controlled voltage control value Vref is inputted into a PWM control section 36 and synchronized with a carrier signal CF so that the duty is calculated. Furthermore, the motor 20 is PWM-driven through an inverter 37 by a PWM signal that the duty is calculated. The motor current value Im of the motor 20 is detected by a motor current detecting means 38 and inputted into the subtracting section 32B to be fed back.

The compensating section 34 adds a detected or estimated self-aligning torque (SAT) 343 to an inertia compensation value 342 in an adding section 344, further adds a convergence control value 341 to an addition result of the adding section 344 in an adding section 345, and then inputs an addition result of the adding section 345 into the adding section 32A as the compensation signal CM to improve the characteristics.

In an electric power steering apparatus comprising a torsion bar, it is necessary to detect angles at a plurality of positions, for example, sensors shown in FIG. 3 are mounted on the column shaft 2, and various detection signals are outputted. That is to say, a Hall IC sensor 21 as an angle sensor and a 20° rotor sensor 22 as an input side torque sensor are mounted on an input shaft 2A of a steering wheel 1 side of the handle shaft 2. The Hall IC sensor 21 outputs an AS_IS angle θh of 296° period, and the AS_IS angle θh is inputted into a steering angle calculating section 40. The 20° rotor sensor 22 that is mounted on the steering wheel 1 side than a torsion bar 23, outputs TS_IS angles θs1 (main) and θs2 (sub) of 20° period, and the TS_IS angle θs1 is inputted into the steering angle calculating section 40. Further, a 40° rotor sensor 24 as an output side torque sensor is mounted on an output shaft 2B of the handle shaft 2, TS_OS angles θr1 (main) and θr2 (sub) are outputted from the 40° rotor sensor 24, and the TS_OS angle θr1 is inputted into the steering angle calculating section 40. The steering angle calculating section 40 calculates a steering angle θab being an absolute value on the basis of the AS_IS angle θh, the TS_IS angle θs1 and the TS_OS angle θr1 to output.

FIG. 4 shows FIGS. 4(A), 4(B) and 4(C) show one example of signal period of the detection signal of each sensor. FIG. 4(A) shows the signal period (296°) of the AS_IS angle θh being the detection signal from the Hall IC sensor 21, FIG. 4(B) shows the signal period (20°) of the TS_IS angle θs1 being the detection signal from the 20° rotor sensor 22, and FIG. 4(C) shows the signal period (40°) of the TS_OS angle θr1 being the detection signal from the 40° rotor sensor 24. "0" point adjustments of these three sensors are adjusted by performing calibration at assembling.

In such an electric power steering apparatus, recently, reliability improvement is further required and the redundancy of apparatuses and parts are carried out. As such a redundancy apparatus, for example, there is a detection signal processing method disclosed in Japanese Published unexamined Patent Application No. H6-32240 A (Patent Document 1), and this detection signal processing method is applied to a steering system for automobile. Further, a physical quantity sensor comprising a second conversion processing section connected to output terminals for converting a first output signal outputted from a first sensor element and a second output signal outputted from a second sensor element into a second physical quantity that the second conversion processing section is disposed within a second package, is disclosed in the publication of Japanese Patent No. 4863953 (Patent Document 2).

THE LIST OF PRIOR ART DOCUMENTS

Patent Documents

Patent Document 1: Japanese Published unexamined Patent Application No. H6-32240 A
Patent Document 2: the publication of Japanese Patent No. 4863953
Patent Document 3: Japanese Published unexamined Patent Application No. 2006-76333 A

SUMMARY OF THE INVENTION

Problems to be Solved by the Invention

However, in the detection signal processing method disclosed in Patent Document 1, since processes that obey functions in a redundant system are carried out and then compared in an external computer, in the case of being applied to an electric power steering apparatus, it is necessary to secure a communication line of that purpose. Further, in the physical quantity sensor disclosed in Patent Document 2, the output terminals are respectively exposed from the sensor elements, a first conversion processing section is disposed within a first package, and the second conversion processing section is disposed within the second package. Accordingly, the whole apparatus becomes a large size, and the physical quantity sensor disclosed in Patent Document 2 is not suitable for the electric power steering apparatus that downsizing and weight reduction are required. Moreover, although it becomes a redundant system configuration, a diagnosing method for function continuation and a function limiting method are not disclosed.

The present invention has been developed in view of the above-described circumstances, and the object of the present invention is to provide an electric power steering apparatus that improves the reliability by means of a redundant system, performs comparison diagnoses of independent detection signals, also concurrently performs individual diagnoses of each detection signal and is capable of continuing functions without spoiling reliability.

Means for Solving the Problems

The present invention relates to an electric power steering apparatus that calculates a current command value by using at least a steering torque and performs an assist control of a steering system by driving a motor based on said current command value, the above-described object of the present invention is achieved by that comprising: at least two respectively independent torque sensors and angle sensors, wherein having a function that respectively calculates steering angles from said torque sensors and said angle sensors to utilize, wherein comparison diagnoses of independent signals are performed and also concurrently individual diagnoses of each individual signal are performed, wherein in a case that it is judged that there is an abnormality in said comparison diagnoses, said angle sensor signals are not used, wherein in a case that it is judged that at least one of said individual diagnoses is abnormal, said angle sensor signal is treated as downgrading, and in a case that it is judged that two or more of said individual diagnoses are abnormal, said angle sensor signals are not used.

Further, the above-described object of the present invention is more effectively achieved by that wherein in said case that it is judged that at least one of said individual diagnoses is abnormal, by using only normal side of said angle sensors, even if reliability declines, continuable functions are continued; or wherein in said case that it is judged that at least one of said individual diagnoses is abnormal, furthermore, an output limiting is performed; or wherein said output limiting is an active return function; or wherein calibration signals for showing a vehicle neutral position are used in said steering angle calculation; or wherein after integrating said electric power steering apparatus into a vehicle, said calibration signals are written into an EEPROM.

Effects of the Invention

An electric power steering apparatus according to the present invention set a torque sensor system and an angle sensor system as a redundant system, performs comparison diagnoses of independent detection signals, also concurrently performs individual diagnoses of each detection signal, in the case that there are abnormalities (including failures) in the angle sensor, carries out a steering angle control (an output limiting) by means of function continuation by using a normal steering angle of two calculated steering angles, and in the case that abnormalities of two angle sensors are judged, makes a steering angle value invalid. Accordingly, the reliability is improved.

Further, in the case that the abnormality is judged by diagnoses of the torque sensor system, assist is stopped to secure safety.

BRIEF DESCRIPTION OF THE DRAWINGS

In the accompanying drawings.

FIG. 3 is a diagram showing a relation between a mounting example of the electric power steering apparatus and sensors, and those detection signals;

FIGS. 4(A), 4(B) and 4(C) are waveform diagrams showing one example of signal period of each sensor;

MODE FOR CARRYING OUT THE INVENTION

The present invention is a redundant system that multiplexes a torque sensor system, an angle sensor system and a steering angle calculating section to improve the reliability of an electric power steering apparatus, performs comparison diagnoses (a torque sensor comparison diagnosis, a steering angle comparison diagnosis and an angle sensor comparison diagnosis) of independent signals and also concurrently performs individual diagnoses of each detection signal by a configuration of respectively calculating steering angles from at least two respectively independent torque sensors and angle sensors (steering angle sensors).

The steering angle is used in a steering wheel return control or the like as an active return function for improving running stability of vehicles and steerability, and in particular the reliability is required.

In the case that the comparison diagnosis is negative (abnormality or failure), a steering angle value is treated as invalidity and the angle sensor signal is not used. In the case that one of the individual diagnoses is negative, the angle sensor signal is treated as downgrading, by using only normal side, even if the reliability declines, continuable functions are continued and also a processing such as performing an output limiting or the like (for example, limiting an output of the active return function to continue) is carried out. However, functions having a possibility to reach serious events, are stopped. In the case that two or more of the individual diagnoses are negative (abnormality or failure), as with the comparison diagnosis, the angle sensor signal is not used. Further, even in the case that the torque sensor signal is not used in steering angle calculation (even in the case of an absolute angle sensor), just the structure changes and it is equal, as examples of the individual diagnoses, there are abnormalities such as abnormalities of sensor power supplies, signal abnormalities (such as communication errors, disconnections or the like) and so on.

Hereinafter, embodiments of the present invention will be described with reference to the accompanying drawings.

Figure 1:
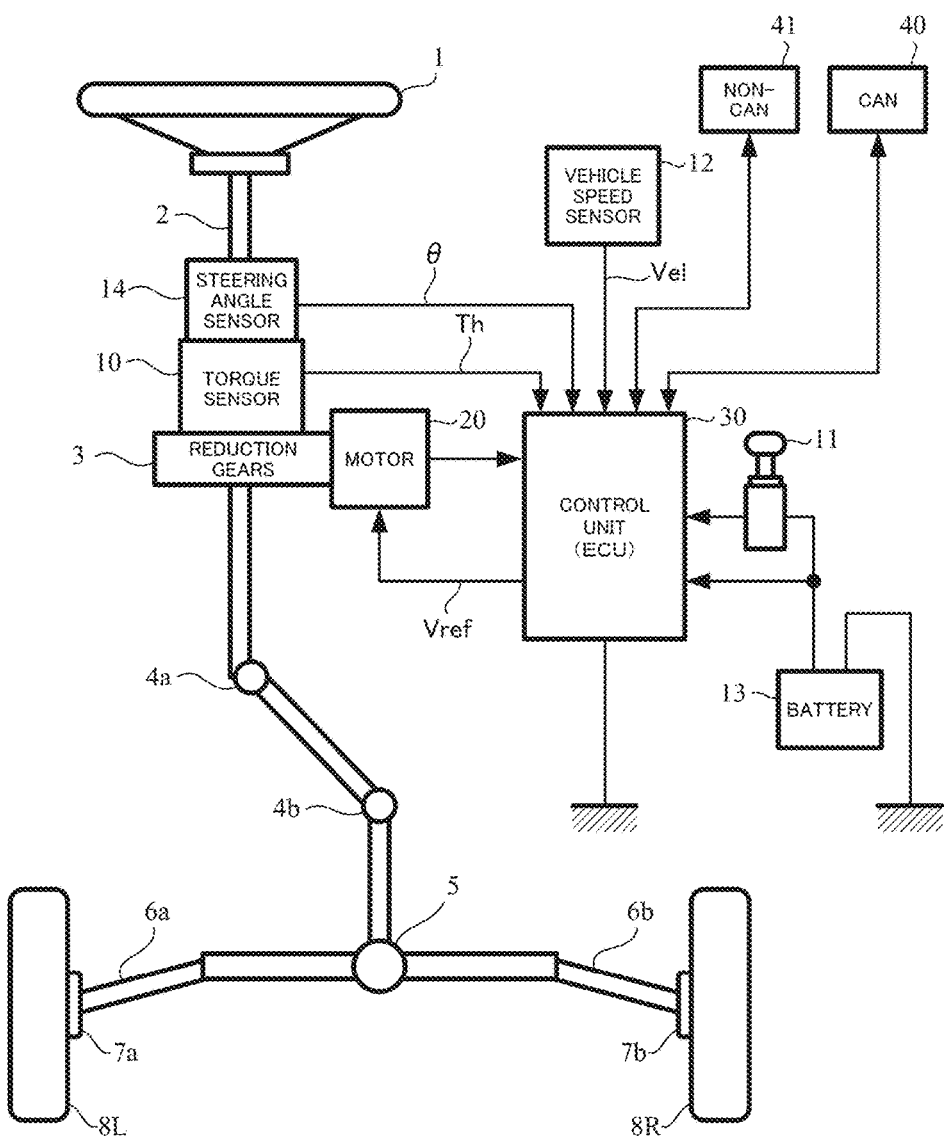
FIG. 1 is a configuration diagram illustrating a general outline of an electric power steering apparatus.
Figure 2:
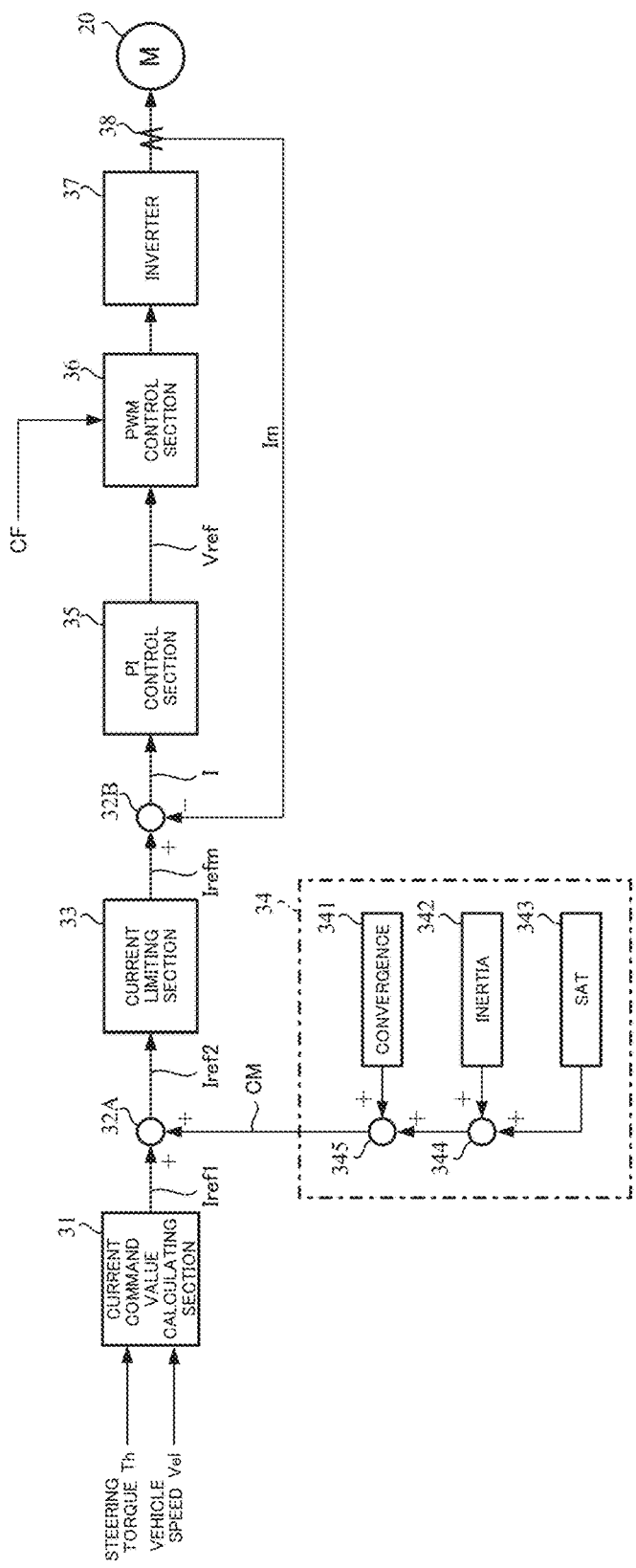
FIG. 2 is a block diagram showing a configuration example of a control system of the electric power steering apparatus.
Figure 5:
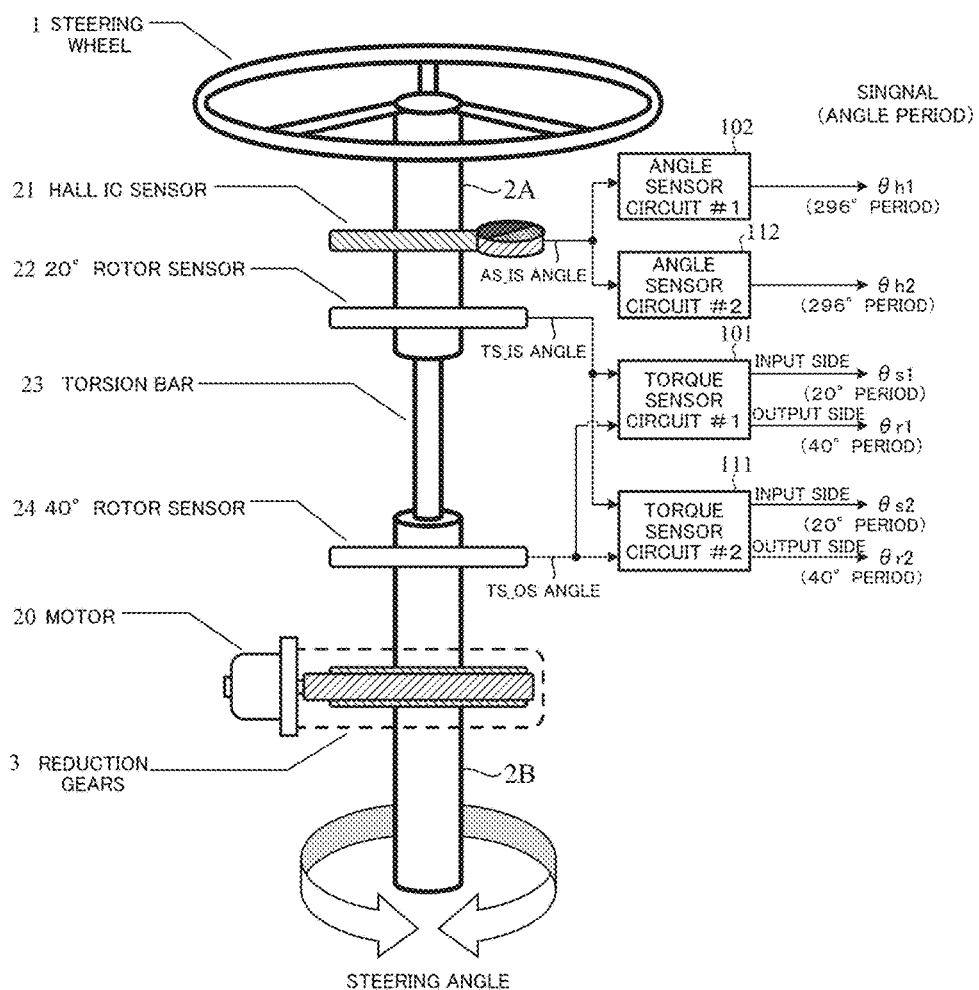
FIG. 5 is a configuration diagram showing sensors and those detection systems of the present invention.

FIG. 5 corresponding to FIG. 3 shows an installation example of various sensors and their signal processing example of the present invention. As shown in FIG. 5, an AS_IS angle from a Hall IC sensor 21 being an angle sensor (a steering angle sensor) is inputted into angle sensor circuits 102 and 112, an angle sensor angle θh1 (296° period) is outputted from the angle sensor circuit 102, and an angle sensor angle θh2 (296° period) is outputted from the angle sensor circuit 112. Further, a TS_IS angle from an input side's rotor sensor 22 being a torque sensor is inputted into torque sensor circuits 101 and 111, and a TS_OS angle from an output side's rotor sensor 24 is inputted into the torque sensor circuits 101 and 111. An input side's torque sensor angle θs1 (20° period) and an output side's torque sensor angle θr1 (40° period) are outputted from the torque sensor circuit 101, and an input side's torque sensor angle θs2 (20° period) and an output side's torque sensor angle θr2 (40° period) are outputted from the torque sensor circuit 111.

Moreover, electric power is supplied to the torque sensor circuits 101 and 111 and the angle sensor circuits 102 and 112 from a separate power supply circuit.

Figure 6:
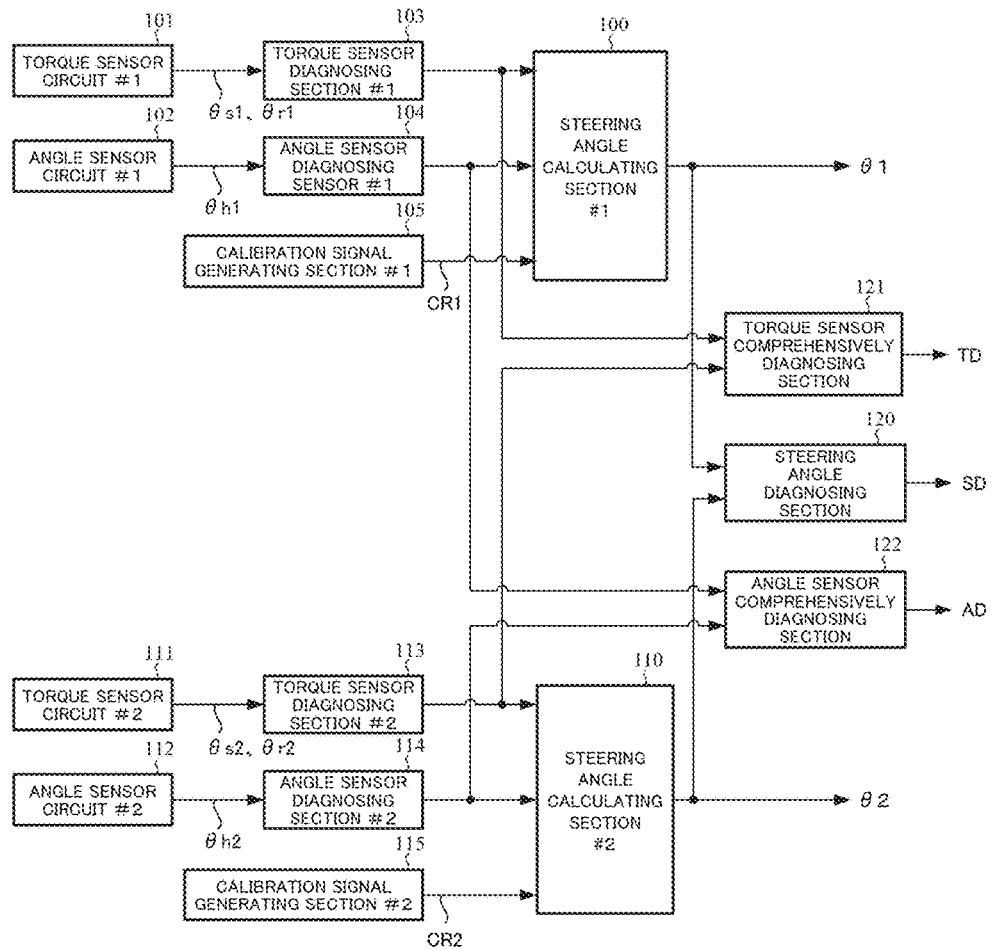
FIG. 6 is a block diagram showing a configuration example of a diagnosis processing section of the present invention.

FIG. 6 shows a configuration example of a signal processing circuit of the present invention. As shown in FIG. 6, the torque sensor angles θs1 and θr1 from the torque sensor circuit 101 are inputted into a torque sensor diagnosing section 103, and the torque sensor angles θs2 and θr2 from the torque sensor circuit 111 are inputted into a torque sensor diagnosing section 113. The angle sensor angle θh1 from the angle sensor circuit 102 is inputted into an angle sensor diagnosing section 104, and the angle sensor angle θh2 from the angle sensor circuit 112 is inputted into an angle sensor diagnosing section 114. In the case that there is no abnormality in each diagnosing section, the inputted signals are outputted as it is and then inputted into steering angle calculating sections 100 and 101 respectively.

That is to say, the torque sensor angles θs1 and θr1 from the torque sensor diagnosing section 103 are inputted into the steering angle calculating section 100 and concurrently inputted into a torque sensor comprehensively diagnosing section 121. The torque sensor angles θs2 and θr2 from the torque sensor diagnosing section 113 are inputted into the steering angle calculating section 110 and concurrently inputted into the torque sensor comprehensively diagnosing section 121. Further, the angle sensor angle θh1 from the angle sensor diagnosing section 104 is inputted into the steering angle calculating section 100 and concurrently inputted into an angle sensor comprehensively diagnosing section 122. The angle sensor angle θh2 from the angle sensor diagnosing section 114 is inputted into the steering angle calculating section 110 and concurrently inputted into the angle sensor comprehensively diagnosing section 122.

A calibration signal CR1 for calibrating a vehicle neutral position is inputted into the steering angle calculating section 100, and a calibration signal CR2 for calibrating the vehicle neutral position is inputted into the steering angle calculating section 110. After integrating the electric power steering apparatus (EPS) into a vehicle, the calibration signals CR1 and CR2 are written into an EEPROM or the like to store. A steering angle θ1 is outputted from the steering angle calculating section 100, a steering angle θ2 is outputted from the steering angle calculating section 110, and the steering angles θ1 and θ2 are inputted into a steering angle diagnosing section 120. A diagnosis result SD is outputted from the steering angle diagnosing section 120, a diagnosis result TD is outputted from the torque sensor comprehensively diagnosing section 121, and a diagnosis result AD is outputted from the angle sensor comprehensively diagnosing section 122.

Further, the steering angle calculating sections 100 and 110 have the same configuration. Here, a configuration example of the steering angle calculating section 100 will be described with reference to FIG. 7.

Figure 7:
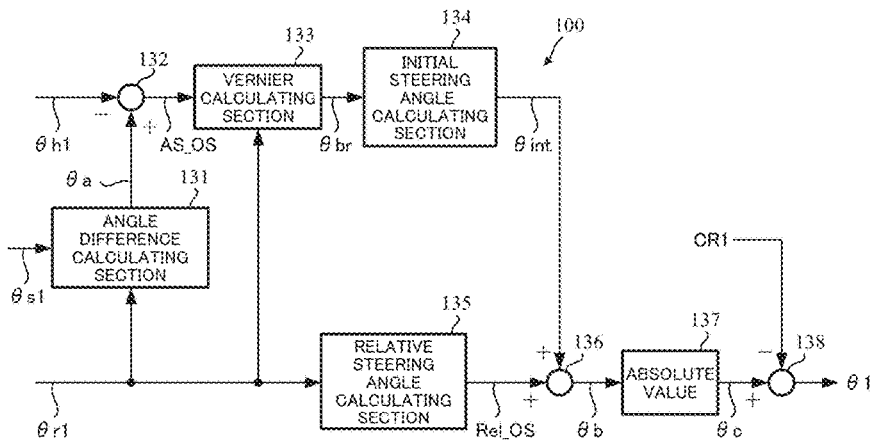
FIG. 7 is a block diagram showing a configuration example of a steering angle calculating section.

As shown in FIG. 7, the angle sensor angle θh1 is subtraction-inputted into a subtracting section 132. The torque sensor angle θr1 is inputted into an angle difference calculating section 131, a vernier calculating section 133 and a relative steering angle calculating section 135. The torque sensor angle θs1 is inputted into the angle difference calculating section 131. A angle difference θa (=θs1−θr1) calculated in the angle difference calculating section 131 is addition-inputted into the subtracting section 132. An angle AS_OS (=θa−θh1) obtained by subtraction in the subtracting section 132 is inputted into the vernier calculating section 133. A steering angle θbr (an absolute steering angle as a sensor reference) calculated in the vernier calculating section 133 is inputted into an initial steering angle calculating section 134. A calculated steering angle initial value θint is outputted from the initial steering angle calculating section 134. The steering angle initial value θint is inputted into an adding section 136. A relative steering angle Rel_OS calculated in the relative steering angle calculating section 135 is also inputted into the adding section 136. A steering angle θb(=θint+Rel_OS) obtained by addition of the adding section 136 is inputted into a conversion-to-absolute-value section 137, and an absolute value steering angle θc is addition-inputted into a subtracting section 138. The calibration signal CR1 is subtraction-inputted into the subtracting section 138. The calibrated steering angle θ1 is outputted from the steering angle calculating section 100.

Since the absolute steering angle θc from the conversion-to-absolute-value section 137 becomes a steering angle position on EPS column (sensors), in the case of mounting the EPS column on the vehicle to use, it is necessary to calibrate a steering angle "0" point on the vehicle (at the vehicle neutral position). The absolute steering angle θc is calibrated by using the calibration signal CR1 to output the steering angle θ1 so that the vehicle neutral position accords with the steering angle "0" point.

Moreover, vernier calculation is a calculation that obtains period position "0~36" (the number of rotations counted from the steering angle (0°) of the rotor sensor 24 in output shaft side by utilizing a phase difference between sensor signals that are different in the period (for example, 40° period, 296° period). Thereby, it is possible to correctly judge which position of a steering angle region "0~1480°" the rotor sensor 24 is in.

The individual diagnoses of each detection signal (diagnoses of a torque sensor #1 (the rotor sensor 22 and the torque sensor circuits 101) and a torque sensor #2 (the rotor sensor 24 and the torque sensor circuits 111), diagnoses of an angle sensor #1 (the Hall IC sensor 21 and the angle sensor circuits 102) and an angle sensor #2 (the Hall IC sensor 21 and the angle sensor circuits 112)) are diagnoses to be capable of being performed independently for every signal of each sensor. Communication abnormalities in the case of receiving from the torque sensor by communication are judged by unreceived, CRC errors, frame errors or the like. Further, errors of the power supply supplied to the sensors, a matter that the power supply is A/D-converted and the converted value is out of range, etc. are judged as abnormalities (including failures).

In order to detect sensor value's offsets/gain failures etc., for example, the comparison diagnoses (a torque sensor comprehensive diagnosis, an angle sensor comprehensive diagnosis and a steering angle diagnosis) are performed as follows.

(1) The Torque Sensor Comprehensive Diagnosis

A case that | a torque value obtained from the torque sensor #1—a torque value obtained from the torque sensor #2|> a predetermined value (for example, 1 Nm), is judged as abnormality.

(2) The Steering Angle Diagnosis

A case that | a steering angle obtained from the torque sensor #1 and the angle sensor #1—a steering angle obtained from the torque sensor #2 and the angle sensor #2|> a predetermined value (for example, (5°), is judged as abnormality.

(3) The Angle Sensor Comprehensive Diagnosis

A case that | an angle value obtained from the angle sensor #1—an angle value obtained from the angle sensor #2|> a predetermined value (for example, (5°), is judged as abnormality.

In the above diagnoses, the diagnoses of the angle sensors #1 and #2 can identify in which sensor abnormality (including failure) occurs. In this case, it is possible to calculate the steering angle by using data from the remaining sensor and continue the control. However, it becomes impossible to carry out a comparison check with high detection coverage. Thereby, since the reliability declines, a limit is set on the function. As the function's limit, for example, it is considered to multiply the output of the active return function (the steering angle is used and the steering wheel return is smoothened) by a limit gain so as to suppress the output. Thereby, although the smoothness of the steering wheel return declines, there is an advantage capable of securing comfort compared to stopping the function.

Further, in the case that the comparison diagnoses are abnormal, since it is impossible to distinguish which sensor has abnormality (or failure), the function relating to the steering angle is stopped and the assist is continued. Although the diagnoses of the torque sensors #1 and #2 can distinguish which sensor has abnormality or failure, since the assist of EPS is stopped, it is excluded.

Figure 8:
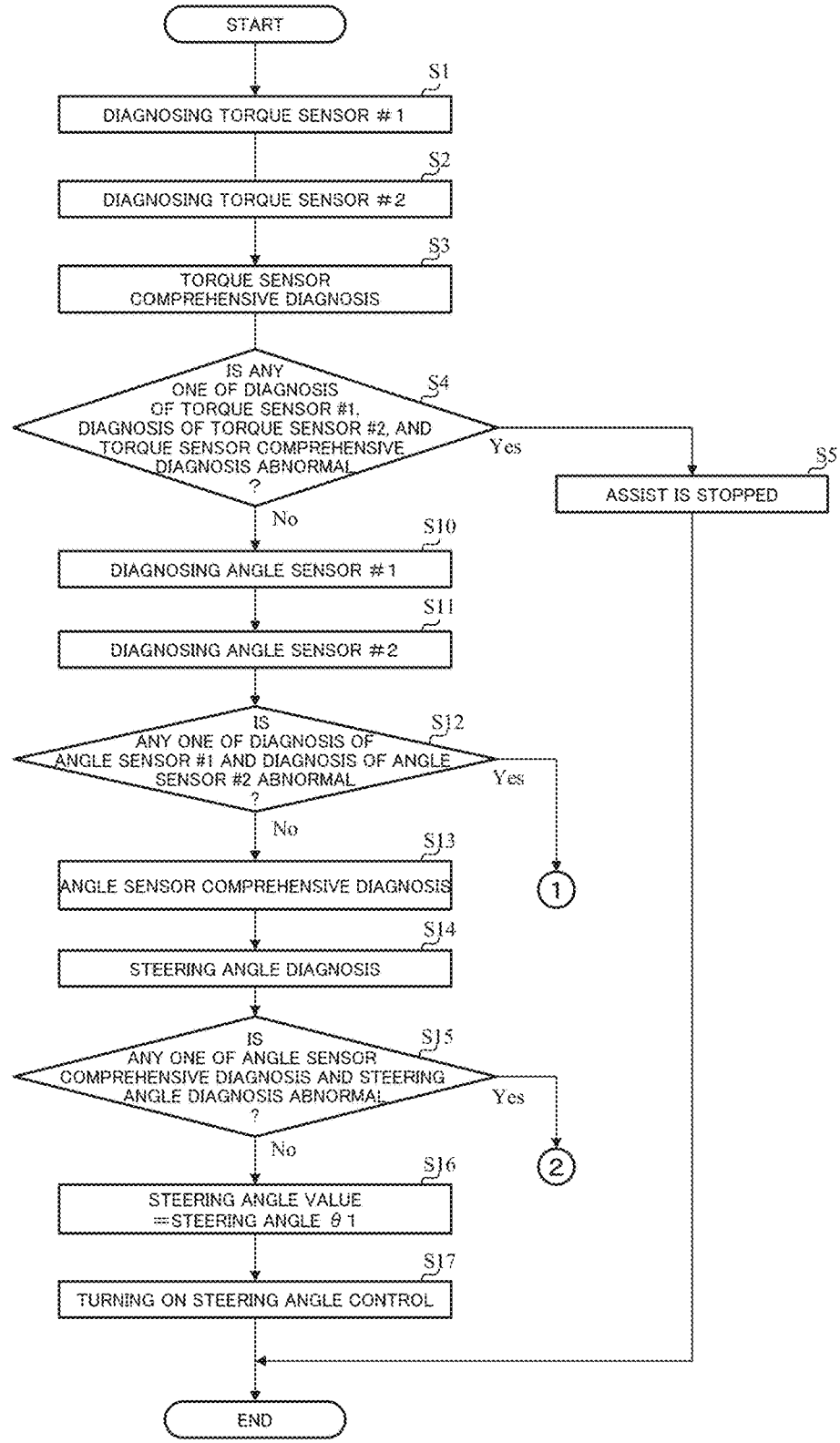
FIG. 8 is one part of a flowchart showing an operation example of the present invention.
Figure 9:
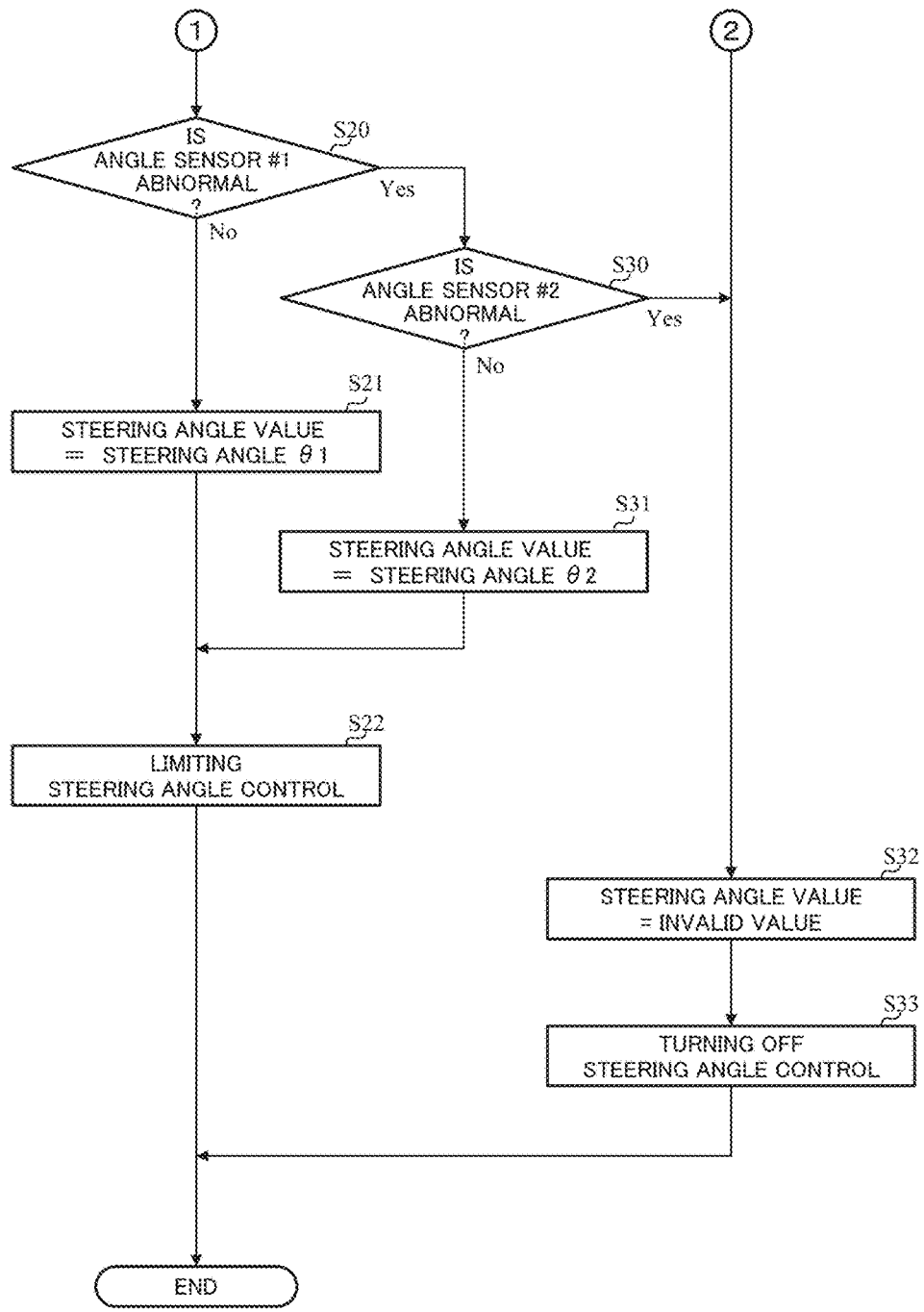
FIG. 9 is another part of the flowchart showing the operation example of the present invention.

In such a configuration and functions, its operation example will be described with reference to a flowchart shown in FIG. 8 and FIG. 9.

The steering angle calculating section 100 calculates the steering angle θ1 based on the torque sensor angles θs1 and θr1, the angle sensor angle θh1 and the calibration signal CR1, as described above. The steering angle calculating section 110 calculates the steering angle θ2 based on the torque sensor angles θs2 and θr2, the angle sensor angle θh2 and the calibration signal CR2, as described above.

As diagnosis operations, at first, the torque sensor diagnosing section 103 individually performs the diagnoses of the rotor sensor 22 and the torque sensor circuit 101 (step S1), the torque sensor diagnosing section 113 individually performs the diagnoses of the rotor sensor 24 and the torque sensor circuit 111 (step S2), and the torque sensor comprehensively diagnosing section 121 performs the comparison diagnosis of the torque sensors (the rotor sensor 22 and the torque sensor circuits 101, the rotor sensor 24 and the torque sensor circuits 111) (step S3). Moreover, the order of individual diagnoses of the torque sensors is optional.

And then, it is judged whether any one of the individual diagnoses and the comparison diagnosis of the torque sensors is abnormal or not (step S4), in the case that any one of the individual diagnoses and the comparison diagnosis of the torque sensors is abnormal, the assist is stopped (step S5).

In a judgment about the presence or absence of abnormalities performed in the above step S4, in the case that it is judged that there is no abnormality, the angle sensor diagnosing section 104 individually performs the diagnoses of the Hall IC sensor 21 and the angle sensor circuit 102 as an angle sensor (step S10), the angle sensor diagnosing section 114 individually performs the diagnoses of the Hall IC sensor 21 and the angle sensor circuit 112 as an angle sensor (step S11), and it is judged whether any one of the individual diagnoses of the angle sensors is abnormal or not (step S12). Moreover, the order of individual diagnoses of the angle sensors is optional. In the case that there is no abnormality in the result of the judgment about the presence or absence of abnormalities, the angle sensor comprehensively diagnosing section 122 performs the comparison diagnosis of the angle sensors (the Hall IC sensor 21 and the angle sensor circuit 102, the Hall IC sensor 21 and the angle sensor circuit 112) (step S13), and further, the steering angle diagnosing section 120 performs the steering angle diagnosis (step S14).

In the case that there is no abnormality in both the angle sensor comprehensive diagnosis (step S13) and the steering angle diagnosis (step S14), i.e. in the case that both the angle sensor comprehensive diagnosis and the steering angle diagnosis are normal (step S15), the steering angle θ1 calculated in the steering angle calculating section 100 is set as the steering angle value (step S16), and the steering angle control is turned on (step S17).

In the case that it is judged that any one of the individual diagnoses of the angle sensors is abnormal in the above step S12, at first, it is judged whether the angle sensor #1 (the Hall IC sensor 21 and the angle sensor circuits 102) is abnormal or not (step S20), in the case that the angle sensor #1 is not abnormal, the steering angle θ1 calculated in the steering angle calculating section 100 is set as the steering angle value (step S21), and the steering angle control is limited (step S22). In the case that the angle sensor #1 is abnormal, it is judged whether the angle sensor #2 (the Hall IC sensor 21 and the angle sensor circuits 112) is abnormal or not (step S30), in the case that the angle sensor #2 is not abnormal, the steering angle θ2 calculated in the steering angle calculating section 110 is set as the steering angle value (step S31), and the steering angle control is limited (step S22).

In the case that it is judged that any one of the angle sensor comprehensive diagnosis and the steering angle diagnosis is abnormal in the above step S15, in the case that it is judged that the angle sensor #2 is abnormal in the above step S30, the steering angle value is made invalid (step S32), and the steering angle control is turned off (step S33).

Moreover, in the above embodiments, although the Hall IC sensor is used as an angle sensor (a steering angle sensor), it is also possible to use other sensor as an angle sensor (a steering angle sensor).

EXPLANATION OF REFERENCE NUMERALS

1 steering wheel (handle)
2 column shaft (steering shaft, handle shaft)
10 torque sensor
12 vehicle speed sensor
13 battery
14 steering angle sensor
20 motor
21 Hall IC sensor (angle sensor, steering angle sensor)
22, 24 rotor sensor (torque sensor)
23 torsion bar
30 control unit (ECU)
31 current command value calculating section
35 PI control section
36 PWM control section
100, 110 steering angle calculating section
101, 111 torque sensor circuit
102, 112 angle sensor circuit
103, 113 torque sensor diagnosing section
104, 114 angle sensor diagnosing section
105, 115 calibration signal generating section
120 steering angle diagnosing section
121 torque sensor comprehensively diagnosing section
122 angle sensor comprehensively diagnosing section
131 angle difference calculating section
133 vernier calculating section
135 relative steering angle calculating section

The invention claimed is:

1. An electric power steering apparatus that calculates a current command value by using at least a steering torque and performs an assist control of a steering system by driving a motor based on said current command value, having:
    at least two respectively independent torque sensors and angle sensors; and
    a function that respectively calculates steering angles from said torque sensors and said angle sensors to utilize;
    wherein comparing diagnoses between independent signals are performed and also concurrently individual diagnoses of each individual signal are performed,
    wherein in a case that it is judged that there is an abnormality in said comparing diagnoses, signals of said angle sensors are not used,
    wherein in a case that it is judged that at least one of said individual diagnoses is abnormal, said signals of said angle sensors is treated as downgrading, and in a case that it is judged that two or more of said individual diagnoses are abnormal, said signals of said angle sensors are not used.

2. The electric power steering apparatus according to claim 1, wherein in said case that it is judged that at least one of said individual diagnoses is abnormal, by using only normal one of said angle sensors, continuable functions are continued even if reliability declines.

3. The electric power steering apparatus according to claim 1, wherein in said case that it is judged that at least one of said individual diagnoses is abnormal, an output of an angle control is limited.

4. The electric power steering apparatus according to claim 2, wherein in said case that it is judged that at least one of said individual diagnoses is abnormal, an output of an angle control is limited.

5. The electric power steering apparatus according to claim 3, wherein said output is an active return function.

6. The electric power steering apparatus according to claim 4, wherein said output is an active return function.

7. The electric power steering apparatus according to claim 1, wherein calibration signals for showing a vehicle neutral position are used in said steering angle calculation.

8. The electric power steering apparatus according to claim 2, wherein calibration signals for showing a vehicle neutral position are used in said steering angle calculation.

9. The electric power steering apparatus according to claim 3, wherein calibration signals for showing a vehicle neutral position are used in said steering angle calculation.

10. The electric power steering apparatus according to claim 4, wherein calibration signals for showing a vehicle neutral position are used in said steering angle calculation.

11. The electric power steering apparatus according to claim 5, wherein calibration signals for showing a vehicle neutral position are used in said steering angle calculation.

12. The electric power steering apparatus according to claim 6, wherein calibration signals for showing a vehicle neutral position are used in said steering angle calculation.

13. The electric power steering apparatus according to claim 7, wherein after integrating said electric power steering apparatus into a vehicle, said calibration signals are written into an EEPROM.

14. The electric power steering apparatus according to claim 8, wherein after integrating said electric power steering apparatus into a vehicle, said calibration signals are written into an EEPROM.

15. The electric power steering apparatus according to claim 9, wherein after integrating said electric power steering apparatus into a vehicle, said calibration signals are written into an EEPROM.

16. The electric power steering apparatus according to claim 10, wherein after integrating said electric power steering apparatus into a vehicle, said calibration signals are written into an EEPROM.

17. The electric power steering apparatus according to claim 11, wherein after integrating said electric power steering apparatus into a vehicle, said calibration signals are written into an EEPROM.

18. The electric power steering apparatus according to claim 12, wherein after integrating said electric power steering apparatus into a vehicle, said calibration signals are written into an EEPROM.

* * * * *